United States Patent [19]

Kehler

[11] 3,840,746

[45] Oct. 8, 1974

[54] GAMMA RAY DENSITY PROBE UTILIZING A PAIR OF GAMMA RAY SOURCES AND A GAMMA RAY DETECTOR

[75] Inventor: Paul Kehler, Niagara Falls, N.Y.

[73] Assignee: Applied Inventions Corporation, Mishawaka, Ind.

[22] Filed: Dec. 13, 1971

[21] Appl. No.: 207,040

[52] U.S. Cl................. 250/360, 250/269, 250/514
[51] Int. Cl........................... G01t 1/16, H01j 39/00
[58] Field of Search.... 250/83.3 D, 83.6 W, 83.6 R; 23/253; 46/99

[56] References Cited
UNITED STATES PATENTS

| 2,991,364 | 7/1961 | Goodman | 250/83.6 X |
| 3,202,822 | 8/1965 | Kehler | 250/83.3 |
| 3,281,599 | 10/1966 | Baker et al. | 250/83.6 X |
| 3,389,257 | 6/1968 | Caldwell et al. | 250/83.6 X |

Primary Examiner—William F. Lindquist

[57] ABSTRACT

A gamma ray density probe utilizing a pair of gamma ray sources and a gamma ray detection system which measures separately and then builds the ratio of the radiation scattered from each of the two sources.

7 Claims, 4 Drawing Figures

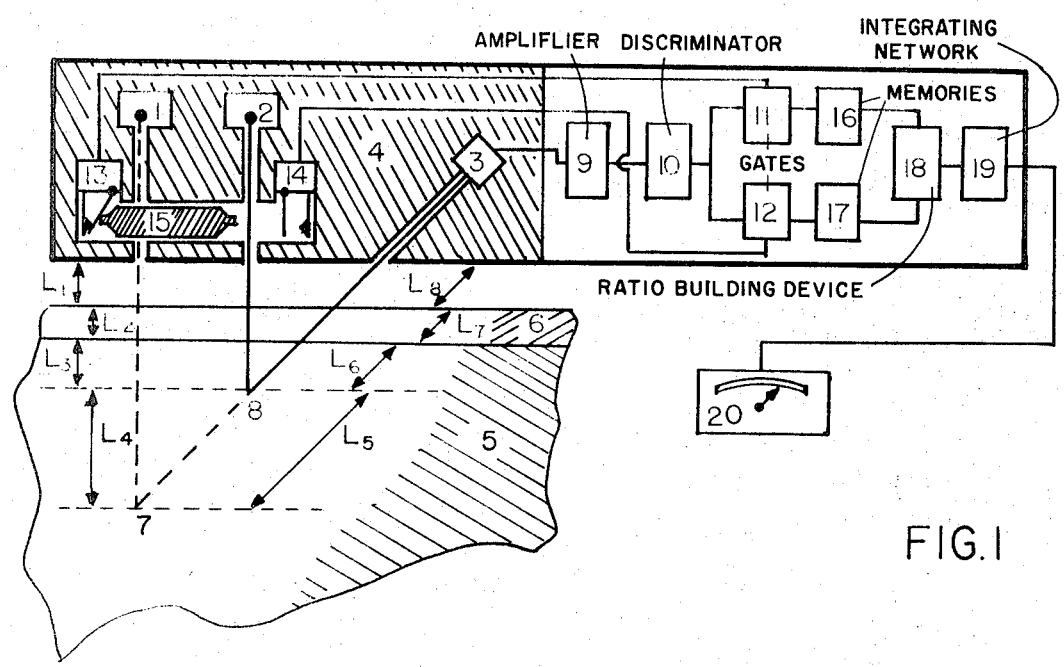
FIG.1
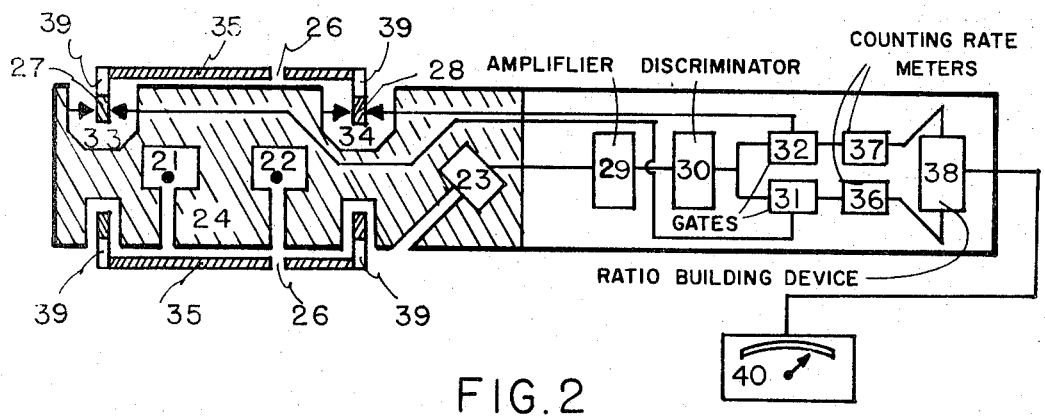
FIG.2
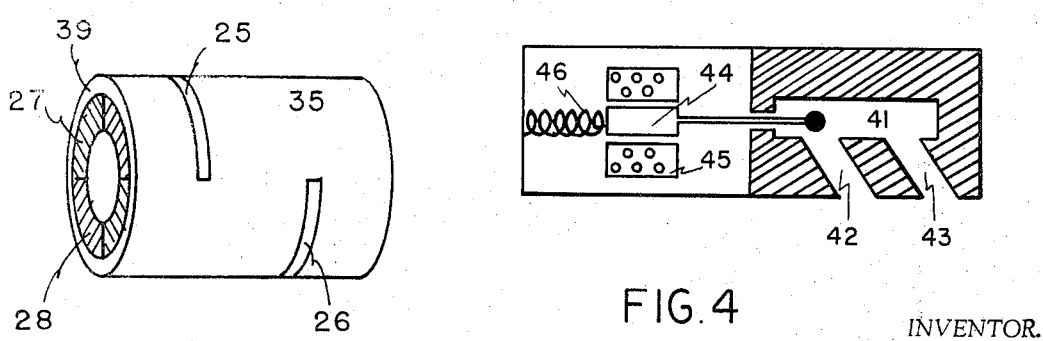
FIG.3
FIG.4
INVENTOR.
BY PAUL KEHLER

GAMMA RAY DENSITY PROBE UTILIZING A PAIR OF GAMMA RAY SOURCES AND A GAMMA RAY DETECTOR

Gamma ray density probes, in their most basic form, are devices incorporating a gamma ray source and a gammy ray detector, shielded from each other for prevention of counting by the detector of radiation that is emitted directly from the source towards the detector. During operation of the gauge, gamma rays (or photons) emitted from the source enter the material to be studied, and interact with the atomic electrons of the material by photoelectric absorption, Compton scattering, of (if the energy of the gamma radiation is high enough) by pair production. The photoelectric absorption process as well as the pair production process remove from the original gamma ray beam those particular photons that are involved in these reactions. In the Compton scattering process, on the other hand, the involved photon only changes its original direction of travel and loses some of its energy. The amount of energy lost by the photon is a function of the scattering angle.

Some of the photons emitted from the source into the sample are scattered towards the detector. Many of these never reach the detector, since their direction is changed by a second Compton scattering, or they are absorbed by the photoelectric absorption process or the pair production process. Those scattered photons that reach the detector and interact with it, are counted by the electronic equipment associated with the detector.

Both the scattering in the material as well as the absorption of photons from the original and the scattered gamma beams, are functions of the electron density of the material which, in turn, can be interpreted in terms of the density of the material itself (in grams per centimeter). For short source-detector spacings, the scattering process dominates over the absorption process, and the counting rate of the detector increases with increasing density.

For long source-detector spacings, the absorption process dominates over the scattering process, and the counting rate of the detector decreases with increasing density of the sample.

The major difficulties encountered in gamma ray density measurements are the definition of the sample size, the limited effective depth of sampling, and the disturbing effects of undesired, interfering materials located between the density probe and the sample. The chemical composition of the sample also effects the reading of conventional gamma ray density probes. These difficulties were reduced in recent designs of density probes, which incorporate one or more of the following features:

1. Collimation of the original and the scattered gamma ray beams for better geometrical definition of the sample.
2. Energy discrimination by the detector, selecting only singly scattered radiation and rejecting multiply scattered radiation, again for better definition of the sample.
3. Application of two detectors and ratio building electronic circuits for the reduction of the effects of interfering materials, and for the elimination of the sensitivity to the chemical composition of the sample.

One of the more advanced density probes disclosed to the public (U.S. Pat. No. 3,202,822) incorporates all these features and is capable of precise measurement of the density of not directly accessible materials, as long as the interfering materials, located between the detectors of the probe and the sample, are identical in thickness and composition at the location of both detectors. For example, in oil well logging applications, such a probe is capable of accurately measuring the density of earth formations through the iron casing of a well, as long as the thickness of the iron casing is constant and the wall of the well is smooth. However, non-uniformities is the wall of the hole will interfere with the proper operation of the probe. Such non-uniformities can be caused by crooked holes, by cave-ins, and by variable thicknesses of the mud cake on the wall of the hole. In all of these situations, unknown and different amounts of materials are positioned between each of the two detectors and the sample volume of the formation to be studied.

The present invention provides a method for reducing the difficulties described above. Generally speaking, the invention comprises the passing of two gamma ray beams from two intermittent gamma ray sources into the formation, receiving separately the radiation backscattered from the two sources in the formation, and building the ratio of these two counting rates.

Since gamma ray sources are more compact than conventional detectors used in gamma ray density probes, they can be collimated more readily and can be situated more closely to each other. Since non-uniformities in the interfering medium are less likely to occur at these closer spacings than at the longer spacings required by two-detector instruments, the difficulties discussed above should be less pronounced in the present invention. In addition, an important source of instability is eliminated by using only one detector instead of two.

The novel features which I believe to be characteristic of this invention are set forth in the appended claims. The principles of the invention, however, are best understood from the following description of specific embodiments of the invention, read in connection with the accompanying drawings, in which FIG. 1 is a diagrammatic presentation of the new density probe in one preferred embodiment, FIG. 2 is a diagrammatic presentation of the new density probe in an embodiment preferred for another application, FIG. 3 is a diagrammatic presentation of the rotating shutter used in the probe shown in FIG. 2, and FIG. 4 is a diagrammatic presentation of a density probe in which the two collimated beams of gamma rays are emitted by only one gamma ray source, said gamma ray source being alternately positioned at two different positions.

The configuration shown in FIG. 1 is the preferred embodiment of a density probe that is used to measure the density of different layers of roads and runways. In this application, only small restrictions are placed on the size and the geometry of the probe, and stationary measurements at varying depths are performed with only small limitations on the measurement time. The difinition of the depth of sampling, however, as well as the accuracy of the density measurement, are important in this application.

In the following description, reference will be made by using numerals which designate components and parts shown in the FIGS. 1, 2, or 3. The characteristic components of the density probe shown in FIG. 1 are a first gamma ray source 1, a second gamma ray source 2, and the detector 3. Both gamma ray sources and the detector are placed in a shield 4 which prevents gamma rays that are emitted from the sources, especially those from source 2 which is closer to the detector 3, to reach the detector directly. Thus, only those gamma rays can reach the detector that are scattered in the sample at a predetermined location. This location (where the gamma rays are scattered towards the detector) is the depth of sampling. For a properly designed probe, this depth of sampling is well defined. The density of materials above or below this depth of sampling does not interfere with density measurement performed by the invented gamma ray density probe, as long as certain conditions are met. Under these conditions, the probe shown in FIG. 1 has the capability to measure, differentially, the density of the sample at various, predetermined depths, and can therefore be referred to as a differential density probe.

In FIG. 1, the definition of the depth of sampling is achieved by the geometrical arrangement of the gamma ray sources and the detector. Both gamma ray sources 1 and 2 are collimated and emit a well defined beam of gamma radiation into the sample 5, through an interfering medium 6. In the following description, the gamma ray beam emitted into the sample by the source 1 will be referred to as the original beam of gamma particles from source 1, and the gamma ray beam emitted into the sample 5 by the source 2 will be referred to as the original beam of gamma particles from source 2.

The detector 3 is also collimated and receives radiation from only one well defined direction. This direction intersects the original beam of gamma particles from source 1 at the point 7, and the original beam of gamma particles from source 2 at the point 8. The distance of the point 7 from the density probe is $D_1 = L_1+L_2+L_3+L_4$. The distance of point 8 from the density probe is $D_2 = L_1+L_2+L_3$. It will be shown later that only the density of that material is measured by the probe that is located at a distance between $D_1$ and $D_2$ from the probe.

Some of the radiation scattered at the points 7 and 8 towards the detector will react with the detector and cause electrical pulses whose amplitude is proportional to the energy of the incident gamma ray particle. These electrical pulses are amplified by a preamplifier and an amplifier 9, which feeds into a discriminator 10. The discriminator is set to pass only those pulses that correspond to the energy of the gamma ray particles that were scattered at the points 7 and 8. Gamma ray particles that underwent multiple scattering prior to entering the detector 3, will be rejected by the discriminator. The output of the discriminator leads to the gates 11 and 12 which are opened and closed by the switches 13 and 14. When switch 13 is closed, gate 11 is also closed, and closing of switch 14 closes the gate 12. The switches are operated by a sliding shutter 15, which slides back and forth during the operation of the density probe and alternately interrupts the original beam of gamma particles from source 1 and the original beam of gamma particles from source 2.

In FIG. 1, the sliding shutter 15 is shown to interrupt the original beam of gamma particles from source 1, and closing the switch 13, gate 11 is closed and gate 12 is open. The pulses passing through gate 12 are stored in memory 17.

As soon as the sliding shutter 15 slides into position where it interrupts the original beam of gamma particles from source 2, it will close the switch 14 which, in turn, will close gate 12 and open gate 11, allowing storage of pulses in memory 16.

The shutter 15 slides back and forth throughout the whole time period of density measurement, alternately interrupting the original beams of gamma particles from the sources 1 and 2, and alternately opening the gates 11 and 12.

Although not specifically indicated in FIG. 1 for simplicity reasons, the switches 13 and 14 serve an additional function:

Just prior to the opening of gate 11 by switch 13, the memory 16 is cleared of previously stored pulses, and just prior to the opening of gate 12 by switch 14, the memory 17 is cleared of previously stored pulses. Also, when both switches 13 and 14 are open, the ratio is computed between the number of pulses in memory 16 and the number of pulses in memory 17, by the ratio building device 18. In the following discussion, the ratio will be denoted as $R$, with $$R = I_1 / I_2, \qquad (1)$$

where $I_1$ = number of counts stored in memory 16 during a time interval when the original beam of gamma particles from source 1 was irradiating the sample, and $I_2$ = number of counts stored in memory 17 during a time interval when the original beam of gamma particles from source 2 was irradiating the sample.

Now, this ratio $R$ is a unique measure of the density of the sample and is not effected by the properties of the interfering medium 6. This is shown by the following considerations:

Let us denote with $N_1$ the total number of gamma particles carried towards the sample by the original beam of gamma particles from source 1 during one cycle of the sliding shutter 15, and with $N_2$ the total number of gamma particles carried by the original beam of gamma particles from the source 2. Assuming a position of the sliding shutter 15 as shown in FIG. 1, i.e., interrupting the original beam of gamma particles from the source 1, the original beam of gamma particles from the source 2 will pass through the interfering medium 6 and into the sample 5, up to and past the point 8. All along this path, the original beam of gamma particles from source 2 is attenuated by the absorption, scattering, and (if the energy is high enough) the pair production process. The original number of gamma ray particles in the beam, $N_2$, is reduced at the point 8 to $$N_3 = N_2 A_{21} A_{22} A_{23},$$

where $A_{21}$ = Attenuation of the original beam of gamma particles from source 2 in the gap (of thickness $L_1$) between the probe 4 and the interfering medium 6, $A_{22}$ = Attenuation of the original beam of gamma particles from source 2 in the interfering medium 6 with thickness $L_2$, $A_{23}$ = Attenuation of the original beam of gamma particles from source 2 in that layer of the sample 5 that has a thickness of $L_3$.

At point 8, a fraction $F_2$ of the (attenuated) original beam of gamma particles from source 2 is scattered towards the detector 3. Since the number of gamma particles at this location is $N_3$, the number of particles scattered towards the detector 3, $N_4$, is $$N_4 = N_3 F_2$$

$$N_4 = N_2 A_{21} A_{22} A_{23} F_2.$$

The beam carrying this number of scattered gamma particles towards the detector 3 will be referred to in the following as the scattered beam of gamma particles from source 2.

From these scattered particles, only the fraction $A_{26} A_{27} A_{28}$ will reach the detector 3, where $A_{26}$ = Attenuation of the scattered beam of gamma particles from source 2 in that layer of the sample that has a thickness of $L_6$, $A_{27}$ = Attenuation of the scattered beam of gamma particles from source 2 in the interfering medium with the thickness $L_7$, and $A_{28}$ = Attenuation of the scattered beam of gamma particles from source 2 in the gap (of thickness $L_8$) between the probe 4 and the interfering medium 6.

The number of particles, $N_5$, that reaches the detector 3 is, therefore, $$N_5 = N_4 A_{26} A_{27} A_{28}, \text{ or}$$

$$N_5 = N_2 A_{21} A_{22} A_{23} F_2 A_{26} A_{27} A_{28}.$$

Assuming that the gap between the shield of the probe 4 and the interfering medium 6 is filled with air, the absorption along the paths $L_1$ and $L_8$ becomes negligible, which means that the corresponding attenuation factors are $$A_{21} = A_{28} = 1,$$

and the number of particles reaching the detector 3 is $$N_5 = N_2 A_{22} A_{23} F_2 A_{26} A_{27}.$$

Due to the limited efficiency of the detection system, only a fraction $E_2$ of the gamma ray particles impinging on the detector 3 will be converted to electronic pulses and stored in the memory 17. The number of pulses stored in the memory 17, $I_2$, is therefore $$I_2 = N_5 E_2, \text{ or}$$

$$I_2 = N_2 A_{22} A_{23} F_2 A_{26} A_{27} E_2. \tag{2}$$

When the sliding shutter 15 moves into a position where it interrupts the original beam of gamma particles from source 2, it closes switch 14 and gate 12, opens switch 13 and gate 11, and allows the original beam of gamma particles from source 1 to enter the sample 5 through the interfering medium 6. Some of the gamma particles scattered at point 7 reach the detector 3 and are converted to pulses that pass through gate 11 and are stored in memory 16. The number of pulses stored in memory 16, $I_1$, is $$I_1 = N_1 A_{12} A_{13} A_{14} F_1 A_{15} A_{16} A_{17} E_1, \tag{3}$$

where $N_1$ = the number of gamma particles carried by the original beam of gamma particles from source 1 into the sample 5 during one cycle of the sliding shutter 15, $A_{12}$ = Attenuation of the original beam of gamma particles from source 1 in the interfering medium 6 with the thickness $L_2$, $A_{13}$ = Attenuation of the original beam of gamma particles from source 1 in that layer of the sample 5 that has a thickness of $L_3$, $A_{14}$ = Attenuation of the original beam of gamma particles from source 1 in that layer of the sample 5 that has a thickness of $L_4$, $F_1$ = The fraction of particles in the original beam of gamma particles from source 1 that is scattered at point 7 towards the detector 3, $A_{15}$ = Attenuation of the scattered beam of gamma particles from source 1 in that layer of the sample 5 that has a thickness of $L_5$, $A_{16}$ = Attenuation of the scattered beam of gamma particles from source 1 in that layer of the sample 5 that has a thickness of $L_6$, $A_{17}$ = Attenuation of the scattered beam of gamma particles from interfering medium 6 with a thickness $L_7$, and $E_1$ = The efficiency of the detection system.

The ratio building device 18 computes the ratio of the numbers stored in the memories 16 and 17. Combining Equations 1, 2, and 3, this ratio becomes:

$$R = \frac{I_1}{I_2} = \frac{N_1 A_{12} A_{13} A_{14} F_1 A_{15} A_{16} A_{17} E_1}{N_2 A_{22} A_{23} F_2 A_{26} A_{27} E_2}. \tag{4}$$

Cobalt 60 or Cesium 137 are common sources used in gamma ray density probes. Since the half life of these radioactive isotopes is very long, the ratio $N_1/N_2$ is known and will not change during the time of the density measurement. This ratio can, therefore, be expressed by a constant, $$c_1 = N_1/N_2.$$

The ratio $F_1/F_2$ does not change either, since the fraction of particles scattered from the original beams of gamma particles towards the detector 3 is proportional to the Klein-Nishina cross section for Compton scattering and the effective solid angle of the detector 3. The Compton scattering cross section depends on the energy of the gamma particles in the original beams and on the scattering angle. The scattering angles at the point 7 and 8 as well as the solid angle of the detector 3 are determined by the geometrical design of the collimators of the two sources 1 and 2 and of the detector 3. Since neither the energy of the gamma particles nor the geometry of the instrument change during a density measurement, the ratio $$c_2 = F_1/F_2$$

remains constant.

The efficiency of the detection system is a function of the gamma ray energy. Since both original beams are composed of gamma particles of the same energy, and since both scattering angles at the points 7 and 8 are identical, the energy of the gamma particles in the scattered beams will also be identical. For this reason, $E_1 = E_2$, or $$c_3 = E_1/E_2 = 1.$$

Combining these three constants into one, $$c = c_1 \, c_2 \, c_3.$$

Insertion of this constant into Equation 4 yields for the ratio $$R = c \frac{A_{12}A_{13}A_{14}A_{15}A_{16}A_{17}}{A_{22}A_{23}A_{26}A_{27}}. \quad (5)$$

With the exception of the constant $c$, only attenuation factors occur in this equation. Now, when a beam of gamma rays passes through a material, it is attenuated by the factor $A = e^{-\mu x}$, where $e$ is the basis of natural logarithms, $\mu$ is the attenuation coefficient, and $x$ is the traversed distance. The attenuation coefficient $\mu$ is a function of the gamma ray energy and the chemical composition of the material through which the gamma ray passes. Therefore, since the energies of the particles in both original beams of gamma particles as well as in both scattered beams of gamma particles are identical, and since the traversed distances shown in FIG. 1, $L_2$, $L_3$, $L_6$ and $L_7$ are identical for the beams of gamma particles from both sources, the following equations are valid:

$$A_{12} = A_{22}, \; A_{13} = A_{23}, \; A_{16} = A_{26}, \; A_{17} = A_{27}. \quad (6)$$

These terms cancel each other in Equation 5, which therefore reads:

$$R = c \, A_{14} \, A_{15}. \quad (7)$$

This equation implies that the measured ratio is a function of the material properties of only the sample 5, and not depending on the thickness and chemical composition of the interfering medium 6. This is true, however, only as long as the thickness and the chemical composition of interfering medium are identical at the locations traversed by the original beams of gamma particles from source 1 and source 2. Only under these conditions are the Equations 6 valid. Two equations of the set of Equations 6 are always valid ($A_{16} = A_{26}$ and $A_{17} = A_{27}$), since the scattered beams of gamma particles from source 1 and from source 2 coincide geometrically. The other two equations are not valid under some circumstances, i.e., $A_{12} \neq A_{22}$ and $A_{13} \neq A_{23}$, and an error is introduced into the density measurement performed by the probe.

If the cycling rate of the sliding shutter 15 is slow enough, the ratio calculated by the ratio building device 18 can be read directly. If, however, the cycling rate of the sliding shutter 15 is too fast for direct reading during each cycle, the ratios computed by the ratio building device 18 must be averaged by an integrating network 19, before it is displayed by the readout device 20.

Thus, in the preferred embodiment shown in FIG. 1, the density of the sample 5 is indicated by the averaged ratio of two counting rates. A different averaging technique is employed in the second preferred embodiment of the invention, which is shown in the FIGS. 2 and 3.

The embodiment shown in the FIGS. 2 and 3 is preferred for oil well logging applications, which require instruments shaped to fit the geometry of narrow boreholes and, in most cases, having the capability to take continuous logs at high logging speeds. Because of these requirements, the preferred embodiment for well logging applications has a cylindrical form of the shield, a shutter that is designed for fast cycling rates, and pulse storing devices that are capable of averaging the rate of pulses over several cycles of operation of the density probe.

The characteristic components of the embodiment shown in FIG. 2 are similar to the components of the embodiment shown in FIG. 1. Thus, two isotopic gamma ray sources 21 and 22 are shielded from detector 23 by the shield 24. Both sources 21 and 22, as well as the detector 23, are collimated. The gamma radiation scattered in the sample (not shown in FIG. 2) towards the detector 23, will react with the detector and cause electrical pulses whose amplitude is proportional to the energy of the incident gamma particles. These pulses are amplified by a preamplifier and an amplifier 29, which feeds into a discriminator 30. The discriminator is set to pass only those pulses that correspond to the energy of gamma particles that were scattered just once and at the geometrically predetermimed points in the sample. The output of the discriminator leads to the gates 31 and 32 which are opened and closed by the switches 33 and 34. When switch 33 is closed, gate 31 is also closed, and closing of switch 34 closes the gate 32. The switches are operated by a rotary shutter 35, which rotates around the shield 24 during the operation of the density probe, and alternately interrupts the original beam of gamma particles from source 21 and the original beam of gamma particles from source 22. The opration of the switches 33 and 34 can be synchronized with the angular position of the rotating shutter 35 by optical, magnetic, or mechanical means. Mechanical switches 33 and 34 are shown in the FIGS. 2 and 3 because of their simplicity. In these figures, the rotating shutter 35 is of cylindrical form and covers the sources 21 and 22 and the corresponding collimators formed in the shield 24. Openings 26 are machined in the shutter 35 that allow unobstructed passage of the original beam of gamma particles from source 22. Openings 25 allow the passage of the original beam of gamma particles from source 21. The openings 25 and 26 are angularly arranged in such a manner that only one source (either source 21 or 22) emits radiation into the sample at any time.

Ridges 39, attached to both ends of shutter 35, reach into the switches 33 and 34 and slide between the two contact points of these switches. Conducting segments 27 and isolating segments 28 are arranged alternately on the ridges 39 of the shutter 35. Whenever a conductive segment 27 is positioned between the contact points of the switches 33 or 34, these switches close. Positioning of an isolating segment 28 between the two contact points of the switches 33 or 34 opens that switch. The angular position of the conducting segments 27 in relation to the openings 25 and 26 is such that, whenever the shutter interrupts the original beam of gamma particles from source 21 and transmits the original beam of gamma particles from source 22, the switch 33 is closed and the switch 34 is opened, and whenever the shutter interrupts the original beam of gamma particles from source 22 and transmits the original beam of gamma particles from source 21, the switch 34 is closed and the switch 33 is opened.

In FIG. 2, the rotating shutter 35 interrupts the original beam from source 21 and closes the switch 33. Gate 31 is closed and gate 32 is open. The pulses passing through gate 32 are fed into the counting rate meter 37.

Because of the fast cycling rate of the sources 21 and 22, only a small number of counts will be transmitted through the gate 32 during one cycle, showing significant statistical variations. The employment of a counting rate meter 37 after gate 32 will smoothen the statistical variations, and the output of the counting rate meter 37, $i_2$, will be proportional to the average counting rate due to the scattered beam of gamma particles from source 22.

As soon as the rotating shutter 35 rotates into position where it interrupts the original beam of gamma particles from source 22, it will close the switch 34 which, in turn, will close gate 32, open gate 31, and admit pulses to the input of counting rate meter 36.

The rotating shutter 35 rotates continuously throughout the whole period of density measurement, alternately interrupting the original beams of gamma particles from the sources 21 and 22, and alternately opening the gates 31 and 32. At any time during the measurement, the output $i_1$ of the counting rate meter 36 indicates the average number of pulses caused by the scattered beam of gamma particles from source 21 and the output $i_2$ of the counting rate meter 27 indicates the average number of pulses caused by the scattered beam of gamma particles from source 22. The ratio building device 38 computes the ratio $R$ of these two counting rates:

$$R = i_1/i_2. \qquad (8)$$

This ratio, displayed by the readout device 40, is similar to the ratio shown in Equation 1, except that $I_1$ and $I_2$ are the numbers of counts received during one cycle of the shutter, and $i_1$ and $i_2$ are numbers obtained by averaging of counts over many cycles of the shutter.

The physics of gamma ray scattering and absorption are identical for the embodiments shown in FIGS. 1 and 2. Therefore, Equation 8 can be developed to read $$R = C\, A_{14}\, A_{15}. \qquad (9)$$

in a manner similar to that used in the derivation of Equation 7. In both cases, the ratios are averaged values, derived from measurements taken during several cycles of the shutter. However, in Equation 7 the $R$ is derived as the average of the ratio of two counting rates, whereas in Equation 9 the $R$ is derived as the ratio of two averaged counting rates. Depending on the specific application of the new gamma ray density probe, one or the other method of electronic pulse processing may be preferable.

In both the preferred embodiments shown in the FIGS. 1 and 2, only one of the two sources shown is irradiating the sample at any time. Simultaneous operation of both sources makes the principle of differential density measurement inoperable. Therefore, it is possible to use only one source for the generation of the two collimated beams of gamma radiation that are necessary for the process of differential density measurement as described above. This is achieved by positioning the single gamma ray source behind two separate collimators, as shown diagrammatically in FIG. 4. In this Figure, the gamma ray source 41 is alternately positioned behind the collimators 42 and 43 for the generation of the two collimated beams of gamma rays. The positioning is performed by a beam controlling means which comprises a plunger 44, a solenoid 45 and a spring 46. Source 41 is attached to plunger 44 in such a manner that, whenever solenoid 45 is activated and plunger 44 is pulled into solenoid 45, the source 41 is brought to rest behind the first collimator 42. Whenever the solenoid 45 is deactivated, spring 46 will push back the plunger 44 and move the source 41 into a position behind the second collimator 43.

The preceding description and the FIGS. 1, 2, 3 and 4 show how gamma ray density probes could be designed, utilizing two sources and one detector, that are capable to measure differentially the density at a predetermined depth. Although two specific embodiments of the invention were illustrated and described, it is understood that various alterations in the details of construction can be made without departing from the scope of the invention, which is indcated in the appended claims.

I claim:

1. A gamma ray density probe utilizing a first collimated beam of gamma rays, a second collimated beam of gamma rays having the same energy as the gamma rays in said first collimated beam, a collimated gamma ray detector, a beam controlling means, a switching means, a first pulse storing means, a second pulse storing means, a ratio building means and an output means, said first collimated beam of gamma rays being emitted into a sample of unknown density from a first reference plane along at least one trajectory at an incident angle of $\alpha$ with respect to said first reference plane, said second collimated beam of gamma rays being emitted into said sample of unknown density from a second reference plane along at least one trajectory at the same incident angle $\alpha$ with respect to said second reference plane, said collimated gamma ray detector being located in a third reference plane and generating an output pulse whenever detecting gamma rays that are scattered from said first and said second collimated beams of gamma rays under an angle $\beta$ towards said collimated gamma ray detector and that are incident on said gamma ray detector at an incident angle of $(\beta-\alpha)$ with respect to said third reference plane, said third reference plane being unequally spaced from said first reference plane and said second reference plane, said beam controlling means turning off said first collimated beam of gamma rays whenever said second collimated beam of gamma rays is turned on and vice versa, said switching means sensing the position of said beam controlling means and opening said first pulse storing means for storage of pulses from said collimated gamma ray detector whenever said first collimated beam of gamma rays is turned on and opening said second pulse storing means for storage of pulses from said collimated gamma ray detector whenever said second collimated beam of gamma rays is turned on, said ratio building means computing the ratio of the number of pulses stored in said first pulse storing means to the number of pulses stored in said second pulse storing means, said ratio being displayed by said output means and being interpreted in terms of the density of said sample of unknown density being irradiated by said first collimated beam of gamma rays and said second collimated beam of gamma rays, and said interpretation of density of said sample being independent of the presence of uniform layers of interfering materials located between said gamma ray density probe and said sample of unknown density.

2. A gamma ray density probe in accordance with claim 1, and comprising a ratio averaging means, wherein said beam controlling means allows a continuous density measurement by initiating repetitive irradiation cycles, each of said irradiation cycles comprising a first time interval in which said first collimated beam of gamma rays is turned on and a second time interval in which said second collimated beam of gamma rays is turned on, said ratio building device computing for each of said irradiation cycles the ratio of the number of pulses stored in said first pulse storing means to the number of pulses stored in said second pulse storing means, said ratio averaging means having a definite time constant over which it averages the ratios computed by said ratio building device, said definite time constant being longer than one of said irradiation cycles.

3. A gamma ray density probe in accordance with claim 1, wherein said beam controlling means allows a continuous density measurement by initiating repetitive irradiation cycles, each of said irradiation cycles comprising a first time interval in which said first collimated beam of gamma rays is turned on and a second time interval in which said second collimated beam of gamma rays is turned on, said first and second pulse storing means having definite time constants over which the average rate of received pulses is derived, said definite time constants being longer than one of said irradiation cycles, and said ratio building device computing the ratio of said average rate of received pulses derived by said first pulse storing means to said average rate of received pulses derived by said second pulse storing means.

4. A gamma ray density probe in accordance with claim 1, wherein said first collimated beam of gamma rays and said second collimated beam of gamma rays are produced by said beam controlling means, by a first gamma ray source that is permanently positioned behind a first collimator and by a second gamma ray source that is permanently positioned behind a second collimator, said beam controlling means being a mechanical shutter that oscillates linearly and interrupts alternately the beam of gamma rays emitted by said first gamma ray source through said first collimator and the beam of gamma rays emitted by said second gamma ray source through said second collimator.

5. A gamma ray density probe in accordance with claim 1, wherein said first collimated beam of gamma rays and said second collimated beam of gamma rays are produced by said beam controlling means, by a first gamma ray source that is positioned permanently behind a first collimator and by a second gamma ray source that is positioned permanently behind a second collimator, said beam controlling means being a rotary shutter of cylindrical form that surrounds said first gamma ray source, said second gamma ray source, said first collimator and said second collimator, and which has circumferentially segmented slots cut through its wall in such a way that, during rotation of said beam controlling means around said first source and said first collimator and said second source and said second collimator, only said first collimated beam of gamma rays or said second collimated beam of gamma rays are transmitted through said slots in said beam controlling means.

6. A gamma ray density probe in accordance with claim 1, wherein said first collimated beam of gamma rays and said second collimated beam of gamma rays are produced by said beam controlling means, by a first collimator, by a second collimator and by a gamma ray source, said beam controlling means positioning said gamma ray source behind said first collimator to produce said first collimated beam of gamma rays, and said beam controlling means positioning said gamma ray source behind said second collimator to produce said second collimated beam of gamma rays.

7. A gamma ray density probe in accordance with claim 1, further comprising a pulse discimination means, wherein said pulse discrimination means passes only those pulses to said first pulse storing means and to said second pulse storing means, that are produced by those gamma rays of said first and second collimated beams of gamma rays that were scattered only once in said sample of unknown density before reaching said collimated gamma ray detector.

* * * * *